US 6,584,857 B1

(12) United States Patent
Furlani et al.

(10) Patent No.: US 6,584,857 B1
(45) Date of Patent: Jul. 1, 2003

(54) OPTICAL STRAIN GAUGE

(75) Inventors: Edward P. Furlani, Lancaster, NY (US); Marek W. Kowarz, Rochester, NY (US); John R. Debesis, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 115 days.

(21) Appl. No.: 09/717,318

(22) Filed: Nov. 20, 2000

(51) Int. Cl.[7] ................................................ G01L 1/24
(52) U.S. Cl. ........................................................ 73/800
(58) Field of Search .......................... 73/800, 653, 655, 73/657; 356/345, 32, 35.5; 250/227; 359/231, 572, 573, 291, 292, 295, 290, 223–225, 900

(56) References Cited

U.S. PATENT DOCUMENTS

| | | |
|---|---|---|
| 4,492,435 A | 1/1985 | Banton et al. |
| 4,596,992 A | 6/1986 | Hornbeck |
| 4,901,586 A | 2/1990 | Blake et al. |
| 5,090,254 A | 2/1992 | Guckel et al. |
| 5,275,055 A | 1/1994 | Zook et al. |
| 5,417,115 A | 5/1995 | Burns |
| 5,550,516 A | 8/1996 | Burns et al. |
| 5,611,593 A | 3/1997 | Fukagawa et al. |
| 5,677,783 A | * 10/1997 | Bloom et al. ........... 359/224 X |
| 5,757,536 A | 5/1998 | Ricco et al. |
| 6,038,057 A | 3/2000 | Brazas, Jr. et al. |
| 6,061,166 A | 5/2000 | Furlani et al. |
| 6,289,740 B1 | * 9/2001 | Posey, Jr. et al. ............. 73/800 |

OTHER PUBLICATIONS

Veijola et al, Equivalent–circuit model of the squeezed gas film in a silicon accelerometer, Sensors and Actuators, A48, 1995.
Furlani et al, Theory and simulation of viscous damped reflection phase gratings, J. Phys D:Appl. Phys 32 (1999).

* cited by examiner

Primary Examiner—Hezron Williams
Assistant Examiner—C Dickens
(74) Attorney, Agent, or Firm—Raymond L. Owens

(57) ABSTRACT

An optical strain gauge for measuring the strain in a structural member includes a mechanical grating device fixedly attached to the structural member for modulating an incident beam of light by diffraction; at least one source of light; and an optical system for directing light onto the mechanical grating device and a sensor for receiving light reflected from the mechanical grating device for producing a representation of the strain in the structural member.

7 Claims, 8 Drawing Sheets

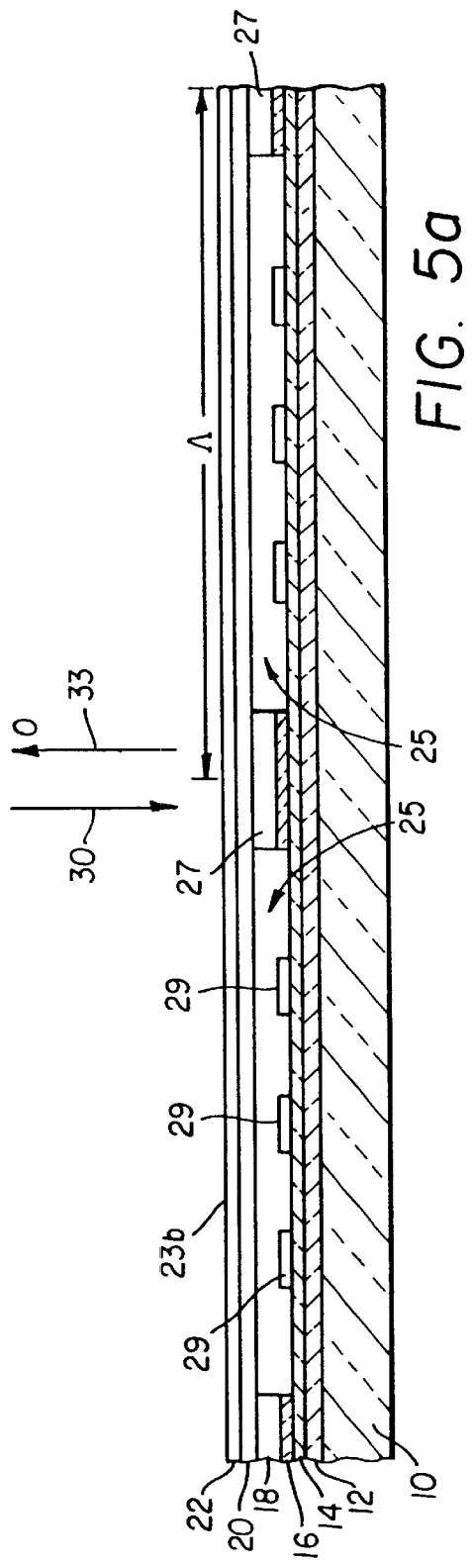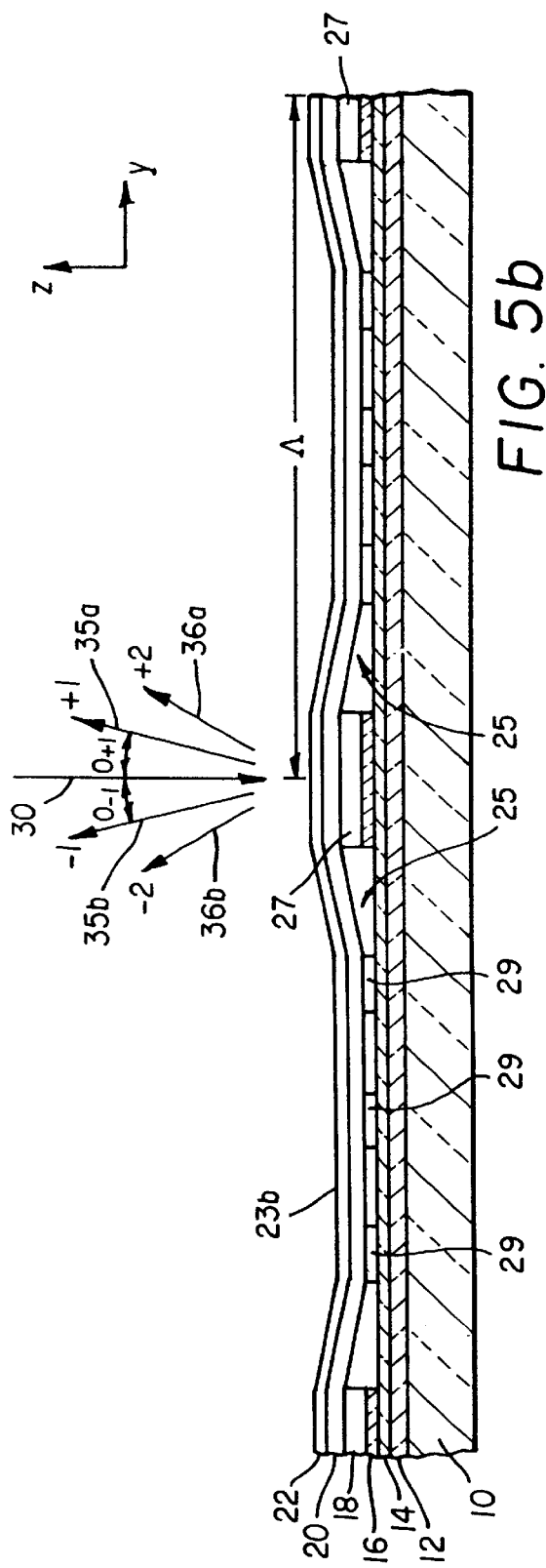
FIG. 5a
FIG. 5b

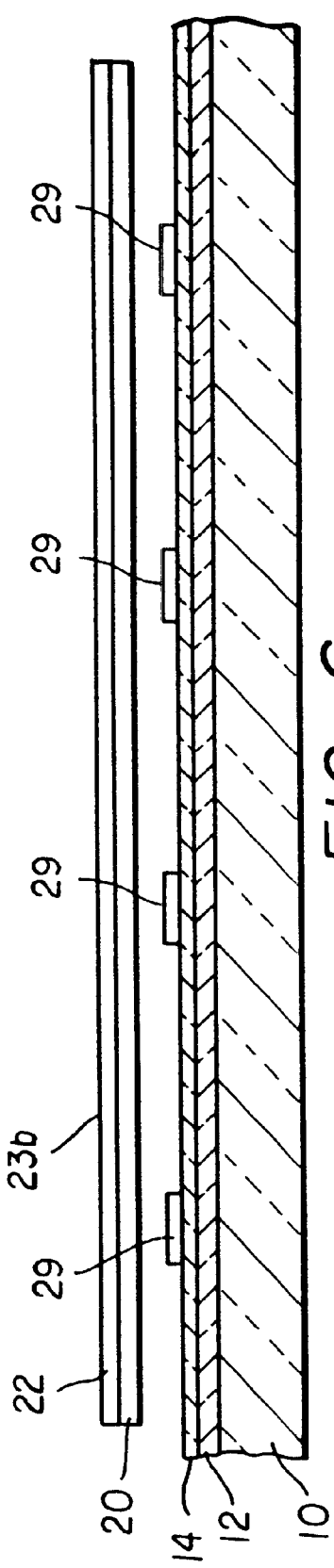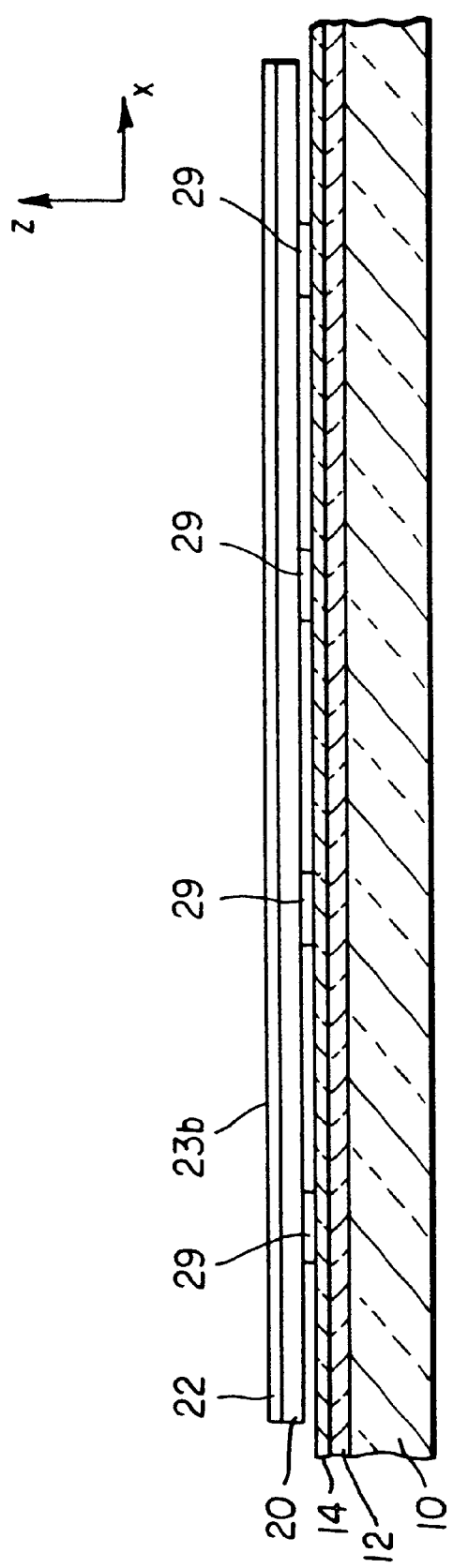

OPTICAL STRAIN GAUGE

CROSS REFERENCE TO RELATED APPLICATION

Reference is made to commonly-assigned U.S. patent application Ser. No. 09/491,354 filed Jan. 26, 2000 entitled "Spatial Light Modulator With Conformal Grating Elements" by Marek W. Kowarz, U.S. Pat. No. 6,307,663 the disclosure of which is incorporated herein.

FIELD OF THE INVENTION

This invention relates to measuring instruments. More particularly, the invention relates to an instrument for measuring strain in structural members, incorporating a diffractive mechanical grating device, that is particularly suitable for a wide range of environmental conditions, including both cryogenic and high temperatures.

BACKGROUND OF THE INVENTION

Advances in micromachining technology have given rise to a variety of micro-electromechanical systems (MEMS) including mechanical grating devices for low cost display applications. Such modulators provide high-resolution, high operating speeds (KHz frame rates), multiple gray scale levels, color adaptability, high contrast ratio, and compatibility with VLSI technology. Representative examples of these modulators are disclosed in U.S. Pat. No. 4,492,435 to Banton et al for a "Multiple Array Full Width Electromechanical Modulator"; U.S. Pat. No. 4,596,992 to Hornbeck for a "Linear Spatial Light Modulator and Printer; U.S. Pat. No. 5,311,360 to Bloom et al for "Method And Apparatus For Modulating a Light Beam"; U.S. Pat. No. 5,611,593 to Engle for a "Linear Electrostatic Modulator"; U.S. Pat. No. 5,757,536 to Ricco et al for an "Electrically Programmable Diffraction Grating"; commonly-assigned U.S. Pat. No. 6,038,057 to Brazas, Jr. et al. for "Method and System For Actuating Electro-mechanical Ribbon Elements In Accordance to a Data Stream" and commonly-assigned U.S. Pat. No. 6,061,166 to Furlani et al for a "Defractive Mechanical Grating Device". Micromachined mechanical grating devices are of particular interest and versatility for strain gauge applications.

Other MEMS devices have been used to sense various physical properties such as acceleration, pressure, mass flow, temperature, humidity, air density or weight. Representative devices are disclosed in U.S. Pat. No. 5,090,254 to Guckel et al for "Polysilicon Resonating Beam Transducers"; U.S. Pat. No. 5,275,055 to Zook and Burns for a "Resonant Gauge With Microbeam Driven In Constant Electric Field"; U.S. Pat. No. 5,417,115 to Bums for "Dielectrically Isolated Resonant Microsensors"; and U.S. Pat. No. 5,550,516 to Burns and Zook for Integrated Resonant Microbeam Sensor and Transistor Oscillator". The sensors disclosed in these patents are said to operate on the principal that the natural frequency of vibration (i.e. resonate frequency of an oscillating beam or other member) is a function of the strain induced in the member. More particularly, tensile forces tending to elongate the member and increase its resonate frequency, while forces tending to compress the member and reduce its natural frequency. The dual vibrating beam transducers disclosed in U.S. Pat. No. 4,901,586 to Blake et al are said to operate in an apparently similar manner. All of the above mentioned transducers and sensors use integrated electrical means to sense the motion of the moving member. This limits the design and placement of both the sensors and the associated electronics.

SUMMARY OF THE INVENTION

It is an object of the present invention to provide an optical strain gauge which can provide highly accurate measurements of the strain in a structural member.

It is another object of the present invention to provide an optical strain gauge in which the strain in a structural member can be monitored at a distance away from the structural member.

These objects are achieved by an optical strain gauge for measuring the strain in a structural member comprising:

(a) a mechanical grating device fixedly attached to the structural member for modulating an incident beam of light by diffraction;

(b) at least one source of light;

(c) an optical system for directing light onto the mechanical grating device and a sensor for receiving light reflected from the mechanical grating device for producing an output signal;

(d) the mechanical grating device including:

(i) an elongated ribbon element including a light reflective surface, such elongated ribbon element having a predetermined resonant frequency;

(ii) a substrate and a pair of end supports for supporting the elongated ribbon element at both ends over the substrate;

(iii) at least one intermediate support between the end supports so that there are suspended portions of the elongated ribbon element; and (iv) a drive circuit for applying a force to the elongated ribbon element to cause the suspended portions of the elongated ribbon element to deform at the resonant frequency between first and second operating states;

(e) output circuitry responsive to the output signal produced by the sensor for extracting a frequency dependent signal which represents the strain in the structural member that caused a variation in the resonant frequency; and (f) an output device responsive to the extracted frequency dependent signal for producing a representation of the strain in the structural member.

The present invention provides an optical strain gauge with at least one optical sensor that can be remotely positioned with respect to the structural member. The preferred embodiment includes a light source that provides light of a wavelength λ, one or more light sensors, a mechanical grating device, and an optical system for directing and focusing light from the light source onto the mechanical grating device and directing the modulated light to the light sensor(s), output circuitry responsive to the output signal produced by the sensor for extracting a frequency dependent signal which represents the strain in the structural member that caused a variation in the resonant frequency, and an output device responsive to the extracted frequency dependent signal for producing a representation of the strain in the structural member. The mechanical grating device is designed to modulate incident light having a wavelength λ. It includes an elongated ribbon element having a light reflective surface; a pair of end supports for supporting the elongated ribbon element at both ends over a substrate; at least one intermediate support between the end supports; and means for applying a force to the elongated ribbon element to cause the elongated ribbon element to deform between first and second operating states.

One advantage of the optical strain gauge of the invention is that the strain of a structural member can be sensed at locations remote from the structural member. Another advantage is the sensitivity of the optical strain gauge due to the size of its features. Specifically, the optical strain gauge features are on the order of microns, and it can measure changes in length on the order of nanometers. Other features and advantages of this invention will be apparent from the following detailed description.

BRIEF DESCRIPTION OF THE DRAWINGS

FIGS. 5a and 5b are cross-sectional views through line 3—3 in FIG. 4 showing the device in an unactuated state and an actuated state, respectively;

FIGS. 6a and 6b are cross-sectional views through line 4—4 in FIG. 4 showing the device in an unactuated state and an actuated state, respectively;

DETAILED DESCRIPTION OF THE PREFERRED EMBODIMENTS

Figure 1:
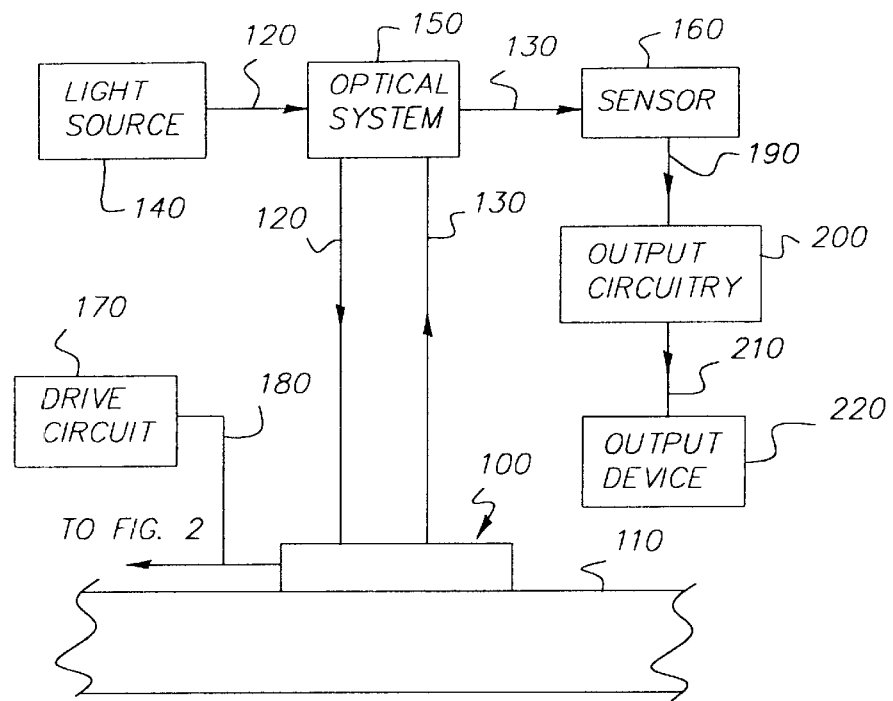
FIG. 1 is a schematic of an optical strain gauge in accordance with the invention.

FIG. 1 is a schematic diagram of an application of the optical strain gauge of the invention. An optical system 150 directs light 120 from a light source 140 onto the mechanical grating device 100, and directs the modulated light 130 from the mechanical grating device 100 to the sensor 160. The light source 140 is preferably a laser or LED which produce light of a wavelength λ. The optical system 150 can consist of free space and/or fiber based optical components. The sensor is preferable a photodiode. The mechanical grating device 100 is fixedly attached to a structural member 110. Drive circuitry 170 is connected to the mechanical grating device 100 via circuit 180, and causes it to operate at its resonant frequency. Any strain in the structural member 110 will alter the resonant frequency of the mechanical grating device 100 as will be described. The change in resonant frequency can be detected by sensor 160 as it monitors the modulated light 130. The sensor 160 provides a sensor signal 190 to output circuitry 200. Output circuitry 200 converts the sensor signal 190 to an output data signal 210 which is stored and/or displayed by output device 220 for subsequent analysis as will be described.

Figure 2:
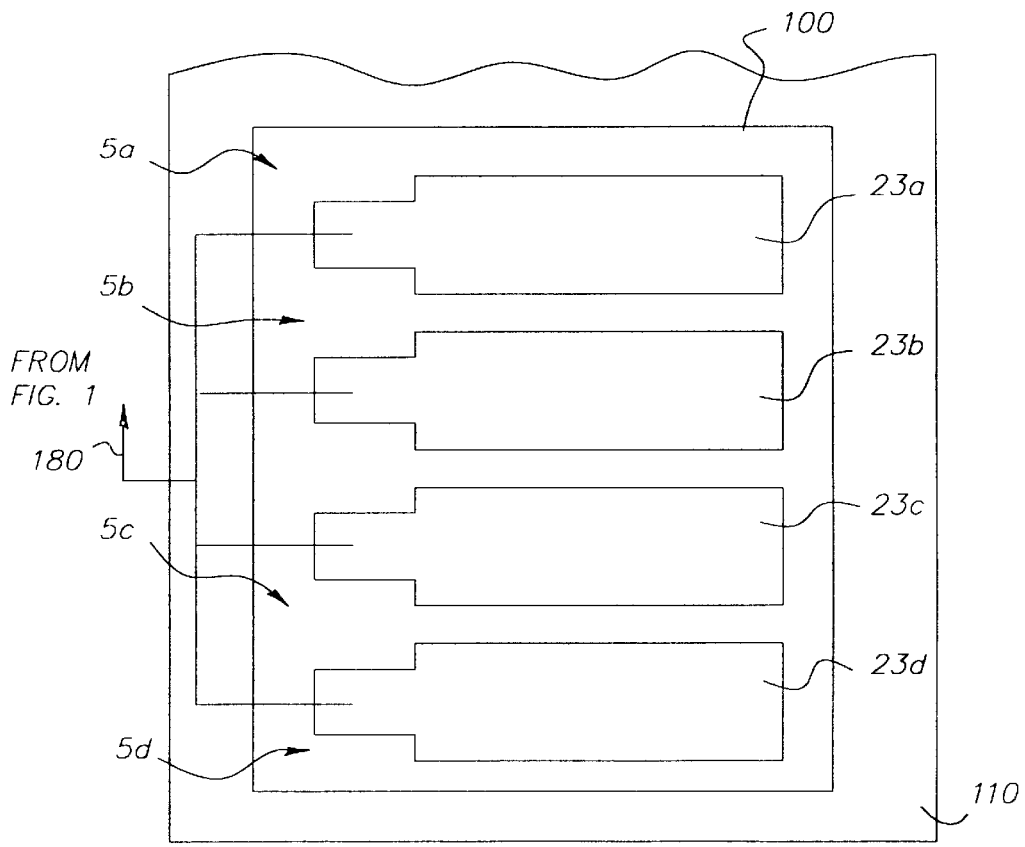
FIG. 2 is a partial top view of the mechanical grating device attached to a structural member.

FIG. 2 is a partial top view showing the mechanical grating device 100, fixedly attached to a structural member 110. The mechanical grating device 100, comprises conformal grating elements 5a, 5b, 5c and 5d, and associated elongated ribbon elements 23a, 23b, 23c, 23d. Drive circuitry 170 is connected to the mechanical grating device 100 via circuit 180. Specifically, circuit 180 is connected to permit activation of conformal grating elements 5a, 5b, 5c and 5d as will be described.

Figure 3:
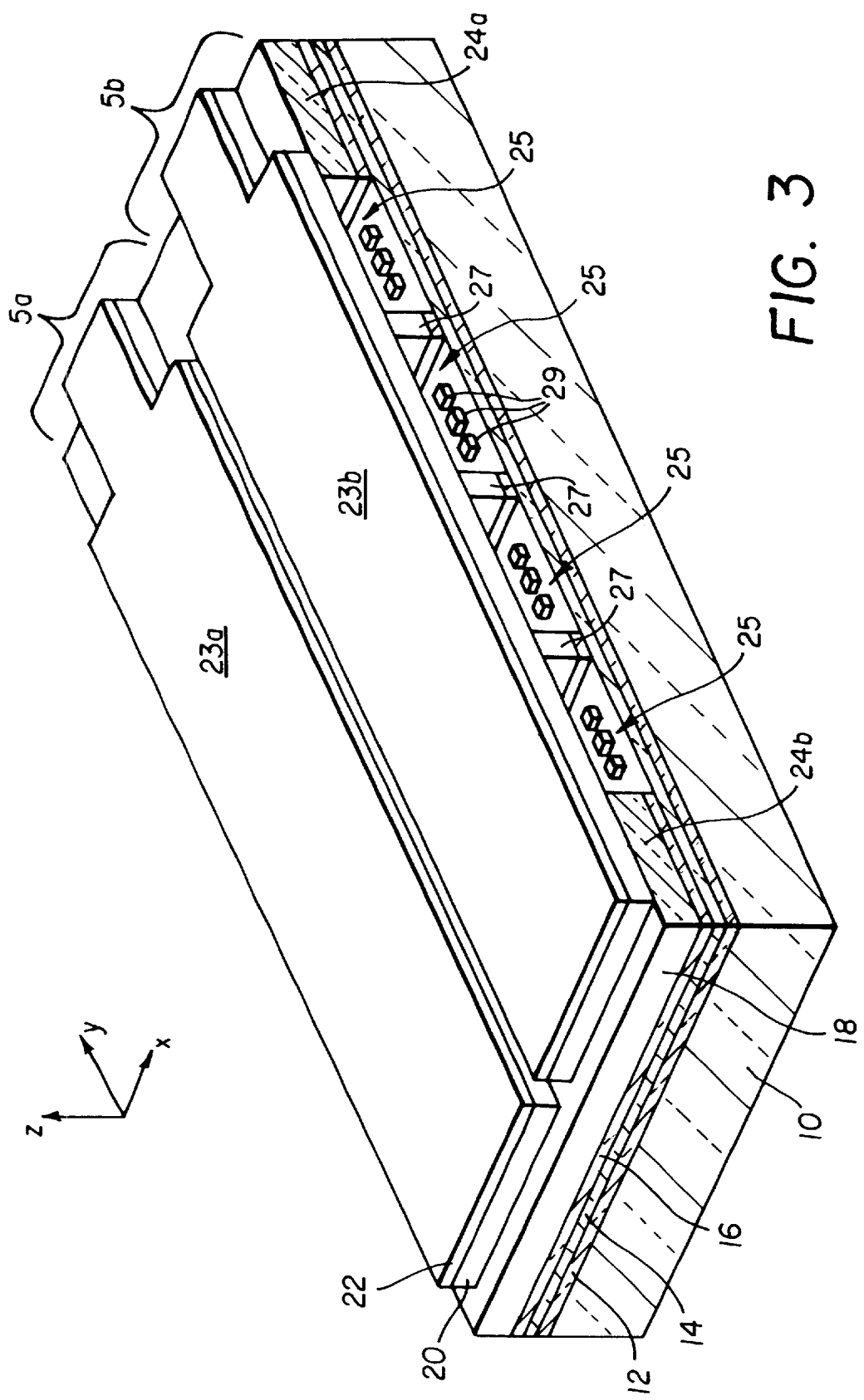
FIG. 3 is a perspective, partially cut-away view of the mechanical grating device showing two conformal grating elements in a linear array.

FIGS. 3 through 8 illustrate the structure and operation of the mechanical grating device 100. FIG. 3 shows the structure of two side-by-side conformal grating elements 5a and 5b in an unactuated state. In this embodiment, these devices can be operated by the application of an electrostatic force. The conformal grating elements 5a and 5b are formed on top of a substrate 10, made of glass, metal, plastic or semiconductor materials, that is covered by a bottom conductive layer 12 which acts as an electrode to actuate the devices. The bottom conductive layer 12 can be made of materials such as aluminum, titanium, gold, silver, tungsten, doped silicon or indium tin oxide. The bottom conductive layer 12 is covered by a dielectric protective layer 14 followed by a spacer layer 18. On top of the spacer layer 18, a ribbon layer 20 is formed which is covered by a reflective layer 22. In the present embodiment, the reflective layer 22 is also a conductor in order to provide electrodes for the actuation of the conformal grating elements 5a and 5b. The reflective and conductive layer 22 is patterned to provide electrodes to the two conformal grating elements 5a and 5b. The ribbon layer 20 preferably includes a material with a sufficient tensile stress to provide a large restoring force. Examples of ribbon materials are silicon nitride, titanium aluminide, and titanium oxide. The thickness and tensile stress of the ribbon layer 20 are chosen to optimize performance by influencing the electrostatic force for actuation and the restoring force. These forces affect the voltage requirement, speed and resonance frequency of the conformal grating elements 5a and 5b.

Each of the two devices 5a and 5b has an associated elongated ribbon element 23a and 23b, respectively, patterned from the reflective and conductive layer 22 and the ribbon layer 20. The elongated ribbon elements 23a and 23b are supported by end supports 24a and 24b formed from the spacer layer 18 and by one or more intermediate supports 27. In FIG. 3, three intermediate supports 27 are shown formed from the spacer layer 18. These intermediate supports 27 are uniformly separated in order to form four equal-width channels 25. The elongated ribbon elements 23a and 23b are secured to the end supports and to the intermediate supports 27. The end supports 24a and 24b are not defined other than at their edges facing the channel 25. A plurality of square standoffs 29 is patterned at the bottom of the channels 25 from the standoff layer 16. These standoffs 29 reduce the possibility of the ribbon elements sticking when actuated. The standoffs may also be patterned in shapes other than square for example rectangular or round.

Figure 4:
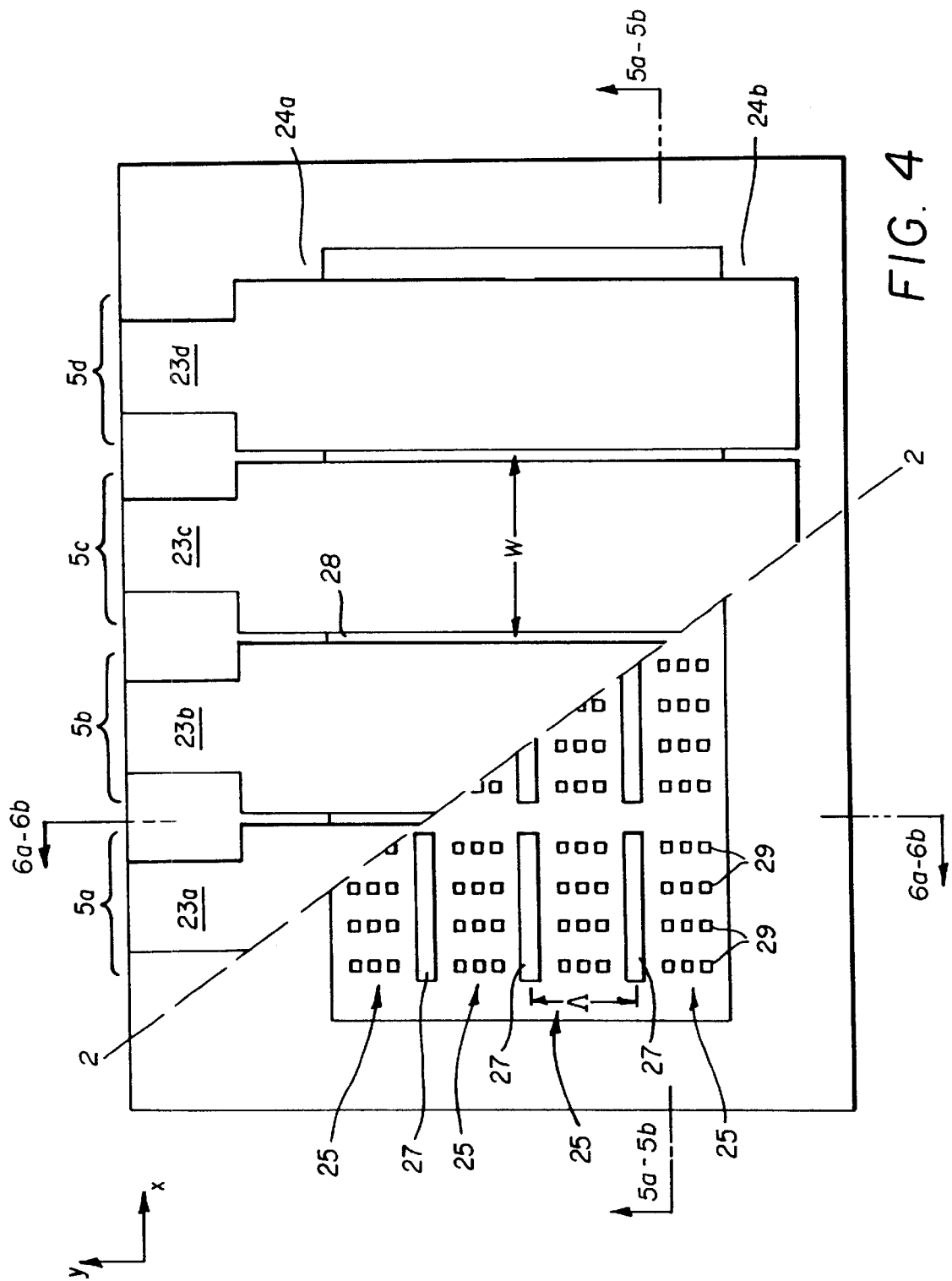
FIG. 4 is a top view of the mechanical grating device, showing four grating elements in a linear array.

A top view of a four-device linear array of conformal grating elements 5a, 5b, 5c and 5d is shown in FIG. 4. The elongated ribbon elements are depicted partially removed over the portion of the diagram below the line 2—2 in order to show the underlying structure. For best optical performance and maximum contrast, the intermediate supports 27 must be completely hidden below the elongated ribbon elements 23a, 23b, 23c and 23d. Therefore, when viewed from the top, the intermediate supports must not be visible in the gaps 28 between the conformal grating elements 5a–5d. Here each of the conformal grating elements 5a–5d have three intermediate supports 27 with four equal-width channels 25.

The center-to-center separation Λ of the intermediate supports 27 defines the period of the conformal grating elements 5a–5d in the actuated state. The elongated ribbon elements 23a–23d are mechanically and electrically isolated from one another, allowing independent operation of the four conformal grating elements 5a–5d. The bottom conductive layer 12 of FIG. 3 can be common to all of the devices.

FIG. 5a is a side view, through line 3—3 of FIG. 4, of two channels 25 of the conformal grating element 5b in the unactuated state. FIG. 5b shows the same view of the actuated state. For operation of the device, an attractive electrostatic force is produced by applying a voltage difference between the bottom conductive layer 12 and the reflective conductive layer 22 of the elongated ribbon element 23b. In the unactuated state (see FIG. 5a), with no voltage difference, the ribbon element 23b is suspended flat between the supports 24a and 24b. In this state, an incident light beam 30 is primarily reflected 32 into the mirror direction. To obtain the actuated state, a voltage is applied to the conformal grating element 5b, which deforms the elongated ribbon element 23b and produces a partially conformal grating with period Λ. FIG. 5b shows the device in the fully actuated state with the elongated ribbon element 23b in contact with the standoffs 29. The height difference between the bottom of element 23b and the top of the standoffs 29 is chosen to be approximately ¼ of the wavelength λ of the incident light. The optimum height depends on the specific shape of the actuated device. In the actuated state, the incident light beam 30 is primarily diffracted into the +1$^{st}$ order 35a and −1$^{st}$ order 35b, with additional light diffracted into the +2$^{nd}$ order 36a and −2$^{nd}$ order 36b. A small amount of light is diffracted into even higher orders and some is reflected. For light incident perpendicular to the surface of the device, the angle $\theta_m$ between the incident beam and the m'th order diffracted beam is given by $$\sin \theta_m = m\lambda / \Lambda,$$

where m is an integer. One or more of the diffracted orders can be collected and used by the optical system, depending on the application. For strain gauge applications, the optical system 150 can be designed to collect any order of diffracted light or the reflected light (FIG. 1). When the applied voltage is removed, the forces due to the tensile stress and bending restores the ribbon element 23b to its original unactuated state.

FIGS. 6a and 6b show a rotated side view through line 4—4 of FIG. 4 of the conformal grating element 5b in the unactuated and actuated states, respectively. The elongated ribbon element 23b is suspended by the end support 24b and the adjacent intermediate support 27 (not shown in this perspective). The application of a voltage actuates the device as illustrated in FIG. 4b.

In the preferred embodiment, a linear array of conformal grating elements is formed by arranging the devices as illustrated in FIGS. 3–6 with the direction of the grating period Λ (the y direction) perpendicular to the array direction (the x direction). The diffracted orders are then at various angles in the y-z plane and are perpendicular to the array direction. Even with a large linear array consisting, possibly, of several thousand devices illuminated by a narrow line of light, the diffracted orders become spatially separated over a relatively short distance. This feature simplifies the optical system design and enables feasible designs in which the separation of orders can be done spatially without the need of Schlieren optics.

To understand the electromechanical and optical operation of the conformal grating element in more detail, it is helpful to examine the expected performance of a realistic design with the following materials and parameters:

Substrate material: silicon

Bottom conductive layer: doped silicon

Protective layer: silicon dioxide, thickness=50 nm

Spacer layer: silicon dioxide, thickness=150 nm

Ribbon layer: silicon nitride, thickness=100 nm, tensile stress=600 Mpa

Reflective and conductive layer: aluminum, thickness=50 nm

Grating period Λ=20 μm

Suspended length of elongated ribbon element=16 μm

Width of elongated ribbon element w=30 μm

Width of intermediate supports=4 μm

This type of design allows for fabrication with CMOS methods and integration with CMOS circuitry. The resonant frequency of the ribbon elements in this particular design is approximately 11 MHz. Most practical designs have resonant frequencies between 2 MHz and 15 MHz. Because of this high resonance, the switching time of the device can be very short.

Figure 7:
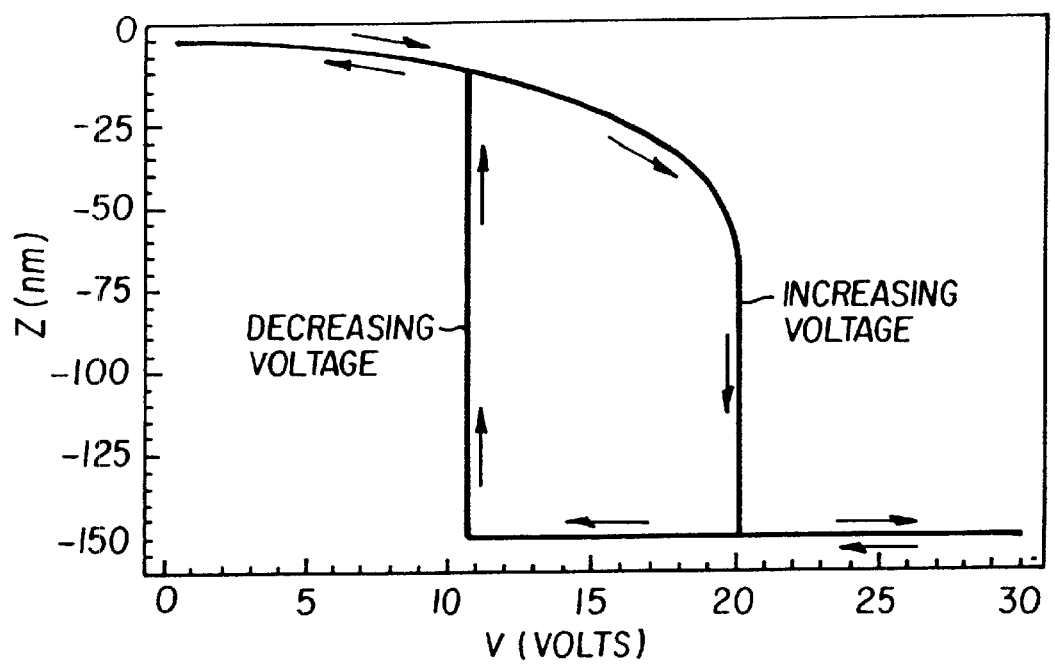
FIG. 7 is a plot showing ribbon element position at the center of a channel as a function of applied voltage.
Figure 8:
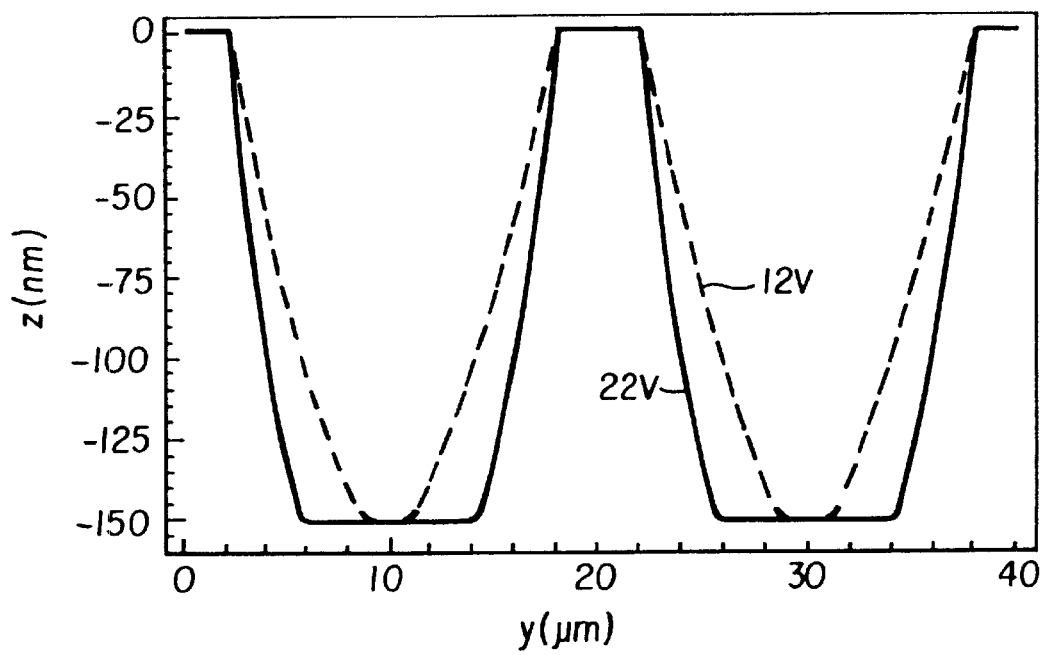
FIG. 8 is a diagram showing the device profile in response to two different actuation voltages.

FIGS. 7 and 8 show the modeled electromechanical operation of this particular device. FIG. 7 is a plot of the position of the elongated ribbon element at the center of a channel as a function of applied voltage, illustrating the associated hysteresis. As the voltage is increased from 0 V, the center displacement increases in approximately a quadratic manner until the pull-down voltage of 20.1 V is reached. At this voltage, the electrostatic force overcomes the tensile restoring force and the ribbon slams into the substrate. Further increasing the applied voltage changes the shape of the deformed ribbon, but cannot change the center position. With the ribbon in contact with the substrate, the voltage can be reduced below the pull-down value while maintaining contact, until release at 10.8 V. This hysteresis can be exploited to improve the optical performance of the device. It can also be used as a switch in certain applications.

FIG. 8 demonstrates how the grating profile may be modified by adjusting the applied voltage. The profile of two periods of the actuated device is shown at 12V (dotted line) and at 22V (solid line), with the ribbon and substrate in contact. To obtain this 12V profile, contact must first be established by applying a value larger than the pull-down voltage of 20.1 V. Because 12V is only slightly larger that the release voltage, only a small portion of the ribbon touches the substrate. This change in shape with voltage has an important impact on the diffraction efficiency of the device.

Figure 9:
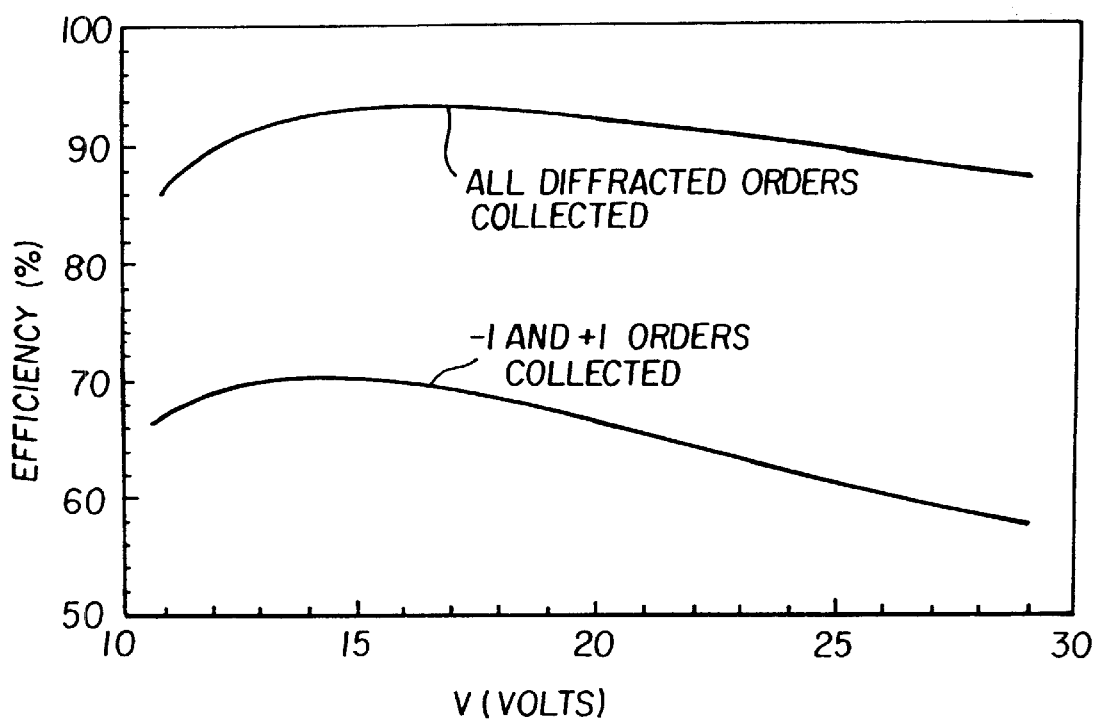
FIG. 9 is a plot showing diffraction efficiency of the device as a function of applied voltage for two different optical systems.

FIG. 9 is a plot of the diffraction efficiency of the device as a function of applied voltage, assuming an illumination wavelength of 550 nm and 100% reflectivity. Efficiency curves are shown for two cases: 1) an optical system that collects of the −1 and +1 diffracted orders and 2) a system that collects all of the diffracted orders. The curves for both cases show that the voltage can be adjusted to maximize the diffraction efficiency. For the first system the maximum occurs at about 14.5 V, whereas for the second it occurs at about 16V. In order to achieve the optimal optical performance with this particular design, it is necessary to first establish contact by applying a voltage larger than the pull-down voltage of 20.1 V. The voltage is then reduced to obtain the optimal shape.

Figure 10:
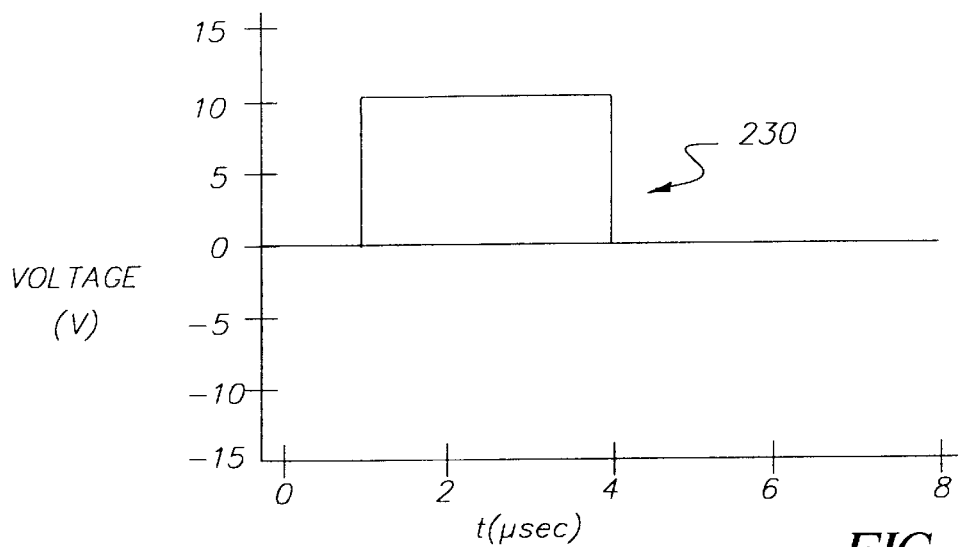
FIG. 10 is a plot of an input voltage pulse for determining the resonant frequency of the mechanical grating device.

FIG. 10 shows an input voltage pulse 230 applied by the drive circuitry 170 across the conductive layer 22 on the grating element 5a and bottom conductive layer 12 for determining strain of structural member 110 (FIG. 3). The input voltage pulse 230 is used to determine the resonant frequency of any of the elongated ribbon elements 23a, 23b, 23c, and/or 23d. Since these elements are identical, it suffices to describe the response of any one of them to the input voltage pulse 230. The response of elongated ribbon elements 23a is considered. It is important to note that only the suspended portions of the elongated ribbon elements 23a are free to vibrate. The suspended potions have a resonant frequency that depends of the length of their span, and the dimensions and material properties of elongated ribbon element 23a. Hereafter, the resonant frequency of the suspended portions of the elongated ribbon element 23a will also be referred to as the resonant frequency of the elongated ribbon element 23a.

Figure 11:
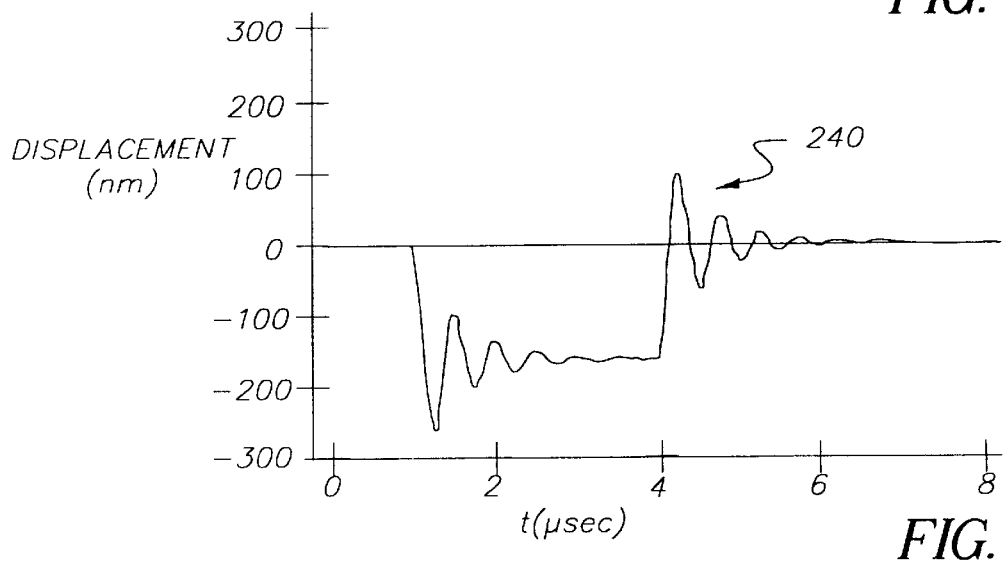
FIG. 11 is a plot of the displacement of the center point of a deformable element in response to the input voltage of FIG. 10.

FIG. 11 shows the response of the elongated ribbon element 23a to the input voltage pulse 230 of FIG. 10. Specifically, it shows the displacement of the elongated ribbon element 23a at the center of a channel 25 (shown in FIG. 5a).

Figure 12:
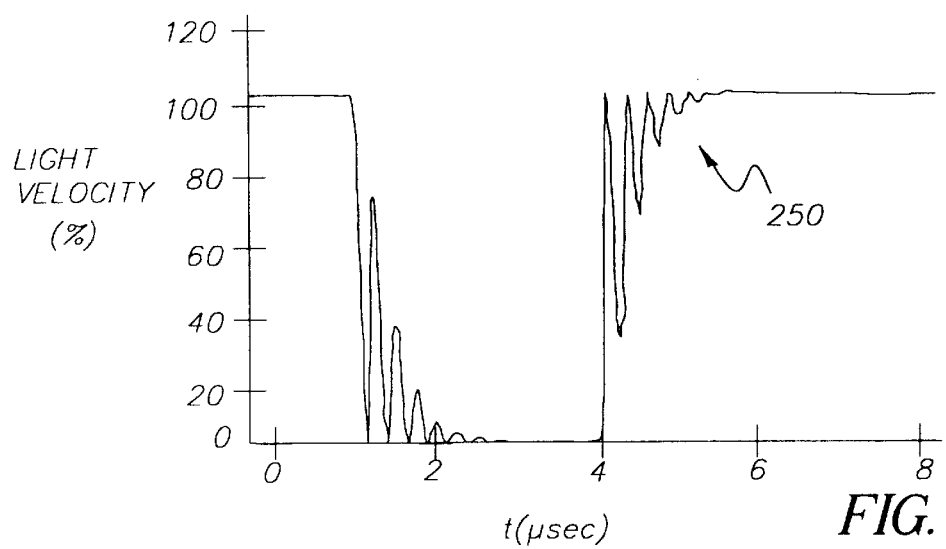
FIG. 12 is a plot of the modulated light intensity produced by the mechanical grating device in response to the input voltage of FIG. 10.

FIG. 12 shows a profile of the modulated light intensity 250 that is generated by the elongated ribbon element 23a in response to the input voltage pulse 230 which is applied by drive circuitry 170. The profile of the modulated light intensity 250 is produced by output device 220 as described in the description of FIG. 1 above.

Referring to FIGS. 10, 11 and 12, the behavior of the mechanical grating device 100 for use as a optical strain gauge is as follows: The resonant frequency $f_{res}$ of the suspended portions of the elongated ribbon element 23a under high tensile stress is given by $$f_{res} = \frac{1}{2\pi L}\left(10\frac{\sigma}{\rho}\right)^{1/2}$$

were σ and ρ are the residual tensile stress and density of the ribbon layer 20 of elongated ribbon element 23a, and L is the length of any one of the suspended portions of elongated ribbon element 23a. It is important to note that the residual tensile stress and density of the elongated ribbon element 23a are substantially equal to tensile stress and density the ribbon layer 20, and therefore we use the same symbols σ and ρ to represent the respective properties of both elements. However, it is straight forward to adapt the analysis to the more general case of two distinct layers with different material properties as is well known. Also, the length of each of the suspended portions of elongated ribbon element 23a are substantially the same. If the elongated ribbon element 23a is subjected to a strain ΔL/L, the resonant frequency changes according to the following formula, $$f_{res} = \frac{1}{2\pi L}\left(10\frac{\sigma + \Delta\sigma}{\rho}\right)^{1/2} \quad \text{where} \quad \Delta\sigma = E\frac{\Delta L}{L}$$

and E is Young's modulus of the ribbon layer 20 of elongated ribbon element 23a. It is important to note that the Young's modulus of the elongated ribbon element 23a is substantially equal to Young's modulus of ribbon layer 20, and therefore we use the same symbol E to represent the properties of both elements. When ΔL<<L, which is the case for optical strain gauge applications, the resonant frequency can be approximated by $$f_{res} \approx f_{res}^0\left(1 + \frac{1}{2}\frac{\Delta\sigma}{\sigma}\right), \quad \text{or}$$

$$f_{res} \approx f_{res}^0\left(1 + \frac{1}{2}\frac{E}{\sigma}\frac{\Delta L}{L}\right).$$

where $f^0_{res}$ is the resonant frequency of a suspended segment of the elongated ribbon element 23a when there is no strain. If the elongated ribbon element 23a is compressed ΔL<0, the resonant frequency is reduced. If the elongated ribbon element 23a is stretched ΔL>0, the resonant frequency increases.

As an example, consider an elongated ribbon element 23a with a ribbon layer 20 made from Silicon Nitride with the following parameters E=210 Gpa, ρ=3100 Kg/m³, and σ=1100 MPa. Assume that the length of the suspended portions of the elongated ribbon element 23a is L=20 microns. The resonant frequency of the deformable element 12a is $f_{res}$=14.32 MHz. If the deformable element 12a is stretched by 5 nanometers, it experience a strain of 0.00025, and the resonant frequency increases by approximately 683 kHz. This frequency shift can be detected, and therefore, the optical strain gauge can be used to detect elongations or contractions of the elongated ribbon element 23a on the order of nanometers.

If the resonant frequency of the elongated ribbon element 23a is measured, the strain can be estimated using $$\frac{\Delta L}{L} \approx 2\frac{\sigma}{E}\left(\frac{f_{res}}{f^0_{res}} - 1\right). \tag{1}$$

The resonant frequency of the elongated ribbon element 23a can be determined as follows: First, drive circuitry 170 applies an input voltage pulse 230 across the conductive layer 22 on the elongated ribbon element 23a and bottom conductive layer 12. This causes the elongated ribbon element 23a at the center of a channel 25 to be displaced as shown in FIG. 11. Specifically, the position of elongated ribbon element 23a at the center of a channel 25 follows the diplacement profile 200. The movement of elongated ribbon element 23a gives rise to a diffraction pattern as described above.

Referring to FIGS. 1 and 12, the strain induced modulated light 130 is directed by the optical system 150 to the sensor 160. The sensor 160 provides a sensor signal 190 to output circuitry 200. Output circuitry 200 converts the sensor signal 190 to an output data signal 210 which is stored and/or displayed by output device 220. A sample profile of modulated light intensity 250 as stored/displayed by the output device 220 is shown in FIG. 12. In this case, the profile of modulated light intensity 250 represents the light reflected from the light modulator i.e., the m=0 diffracted mode. The profile of modulated light intensity 250 is of the form $$I(t)=I_o[1-Ae^{-\gamma t}\cos^2(\beta f_{res}t+\delta)].$$

where t=0 corresponds to trailing edge of the input voltage pulse 230, $I_0$ is the intensity of the incident light 120, and γ and β are device dependent parameters. The profile of modulated light intensity 250 can be curve fit to determine the resonant frequency $f_{res}$ of elongated ribbon element 23a, as is well known. Once $f_{res}$ is known, Equation (1) can be used to determine the strain.

It is instructive to note that the oscillation of the suspended portions of elongated ribbon element 23a is damped out due to the squeeze film damping effects of the ambient gas in the gap beneath elongated ribbon element 23a as described in by E. P. Furlani, in "Theory and Simulation of Viscous Damped Reflection Phase Gratings," J. Phys. D: Appl. Phys, 32(4), 1999, and by T. Veijola, H. Kuisma and T. Ryhanen in "Equivalent-circuit model of squeezed gas film in a silicon accelerometer," Sensors and Actuators A 48, 1995.

As those skilled in this art will readily appreciate from the foregoing description and the accompanying drawings, the optical strain gauge of this invention can sense strain optically, at locations remote from the strained structural member. Moreover, is it used to measure structural changes in length on the order of nanometers. Of course, those skilled in the art will also appreciate that many modifications may be made to the embodiments disclosed herein within the scope of this invention, which is defined by the following claims.

The invention has been described in detail with particular reference to certain preferred embodiments thereof, but it will be understood that variations and modifications can be effected within the spirit and scope of the invention.

PARTS LIST

| | |
|---|---|
| 5a | conformal grating element |
| 5b | conformal grating element |
| 5c | conformal grating element |
| 5d | conformal grating element |
| 10 | substrate |
| 12 | bottom conductive layer |
| 14 | protective layer |
| 16 | standoff layer |
| 18 | spacer layer |
| 20 | ribbon layer |
| 22 | reflective conductive layer |
| 23a | elongated ribbon element |
| 23b | elongated ribbon element |
| 23c | elongated ribbon element |
| 23d | elongated ribbon element |
| 24a | end support |
| 24b | end support |
| 25 | channel |
| 27 | intermediate support |
| 28 | gap |
| 29 | standoff |
| 30 | incident light beam |
| 32 | reflected light beam |
| 35a | +1$^{st}$ order beam |
| 35b | −1$^{st}$ order beam |
| 36a | +2$^{nd}$ order beam |
| 36b | −2$^{nd}$ order beam |
| 100 | mechanical grating device |
| 110 | structural member |
| 120 | incident light |
| 130 | modulated light |
| 140 | light source |
| 150 | optical system |
| 160 | sensor |
| 170 | drive circuitry |
| 180 | circuit |
| 190 | sensor signal |
| 200 | output circuitry |
| 210 | output data signal |
| 220 | output device |
| 230 | input voltage pulse |
| 240 | displacement profile |
| 250 | profile of modulated light intensity |

What is claimed is:

1. An optical strain gauge for measuring the strain in a structural member comprising:
   (a) a mechanical grating device fixedly attached to the structural member for modulating an incident beam of light by diffraction;
   (b) at least one source of light;
   (c) an optical system for directing light from the at least one source of light onto the mechanical grating device and a sensor for receiving light reflected from the mechanical grating device for producing an output signal;
   (d) the mechanical grating device including:
      (i) an elongated ribbon element including a light reflective surface, such elongated ribbon element having a predetermined resonant frequency;
      (ii) a substrate and a pair of end supports for supporting the elongated ribbon element at both ends over the substrate;
      (iii) at least one intermediate support between the end supports so that there are suspended portions of the elongated ribbon element; and
      (iv) a drive circuit for applying a force to the elongated ribbon element to cause the suspended portions of the elongated ribbon element to deform at the resonant frequency between first and second operating states;
   (e) output circuitry responsive to the output signal produced by the sensor for extracting a frequency dependent signal which represents the strain in the structural member that caused a variation in the resonant frequency; and
   (f) an output device responsive to the extracted frequency dependent signal for producing a representation of the strain in the structural member.

2. The optical strain gauge of claim 1, wherein in the first operating state, the elongated ribbon element functions as a plane reflector and in the second operating state the elongated ribbon element functions as a diffraction grating.

3. The optical strain gauge of claim 1, wherein the elongated ribbon element is supported under tension.

4. The optical strain gauge of claim 1 wherein the mechanical grating device includes a substrate, a bottom conductive layer, and wherein the elongated ribbon element includes a conductive portion and the drive circuit applies a pulse between bottom conductive layer and the conductive portion to exert the force on the elongated ribbon element.

5. The optical strain gauge of claim 4 wherein the mechanical grating device further includes a plurality of substantially identical elongated ribbon elements.

6. The optical strain gauge of claim 1 wherein the output circuitry produces a representation of the modulation of the light beam caused by the strain in the elongated ribbon element and having a frequency related to the strain in the elongated ribbon element or structural member.

7. The optical strain gauge of claim 6 wherein the strain in the structural member is determined in accordance with the following relationship:

$$\frac{\Delta L}{L} \approx 2\frac{\sigma}{E}\left(\frac{f_{res}}{f^0_{res}} - 1\right)$$

wherein $\sigma$ and E are the residual tensile stress and Young's modulus of the elongated ribbon element, $f_{res}$ and $f^0_{res}$ are the resonant frequencies of the elongated ribbon element with and without strain, respectively, and $\Delta L/L$ is the strain of the elongated ribbon element.

* * * * *